Patented June 13, 1939

2,161,882

UNITED STATES PATENT OFFICE 2,161,882

METHOD OF PREPARING VITAMIN CONCENTRATES

James A. Patch, Stoneham, Mass.

No Drawing. Application October 21, 1936, Serial No. 106,897

5 Claims. (Cl. 167—81)

This invention relates to a process of extracting the vitamin principle or therapeutically active substance from oils, fats, fatty acids, and the like vitamin-containing materials.

The principal objects of the invention are to provide a simple, efficient and economical process for separating the relatively non-saponifiable vitamin-containing moiety from the saponifiable matter, and to provide a process wherein the extraction of the unsaponifiable matter from the saponified material may be carried out quickly and without any danger of forming emulsions such as are encountered in the procedures heretofore used.

Further objects will be apparent from a consideration of the following description which discloses a preferred procedure illustrative of the invention.

In accordance with the present invention, a vitamin-containing material, such as cod liver oil or the like, is saponified with a caustic solution, preferably an aqueous-alcoholic solution, wherein the ratio of the different ingredients is, for example, of the order of 1 part (by weight) caustic, 7.7 parts water, 2.7 parts alcohol, to 5.2 parts of the vitamin-containing material. The saponified mass consists of an aqueous alcoholic solution of soap and non-saponifiable material, and this mass is then treated with ether or the like organic solvent which is partially miscible with an aqueous alcoholic soap solution but substantially immiscible with water and having substantially no solvent action, per se, on soap. The ratio of the organic solvent to the saponified mass may be varied in accordance with the solubility of the former in the latter, but in any event the organic solvent should be added in sufficient quantity completely to dissolve the saponified mass and produce a relatively concentrated solution of the saponified mass in the organic solvent. Under these conditions there is produced a homogeneous clear solution in which the soap, solvent and the added organic solvent are in balanced phase. The balance is then upset, as for example by the addition of sufficient water to cause the solution to break down into two layers, one of which contains the dissolved soap, and the other the unsaponified moiety dissolved in the organic solvent.

The two layers may then be separated and that containing the unsaponified moiety is preferably washed with water or otherwise treated in any suitable manner to remove any soap and other impurities. The purified solution may then be concentrated by the elimination of the organic solvent, which may be recovered for later use, and the concentrated extract may then be dried under vacuum to remove all traces of moisture and solvent, thus producing a concentrate which contains the therapeutically active vitamin principle which, if desired, may be further purified in accordance with procedures well known in the art.

A specific example of my process is as follows:

Sixty-five pounds (5.2 parts by weight) of cod liver oil are saponified at a temperature of about 70° C. with ten gallons of caustic soda solution containing twelve and one-half pounds (1 part by weight) of sodium hydroxide, five gallons (3.3 parts by weight) of water, and five gallons (2.7 parts by weight) of 95% alcohol, for a period of approximately thirty minutes, or until saponification is substantially complete. Six and one-half gallons (4.4 parts by weight) of water are then added and the saponified mass is cooled to 35° to 40° C., after which five gallons of ether are first added and followed by the addition of approximately two hundred and fifty gallons of ether (U. S. P.), thus bringing the volume ratio of ether to the alcohol-water mixture to approximately 10:1. At this point the entire mass is a clear homogeneous solution in which the three solvents, viz., water, alcohol and ether, are in balanced phase. The balance is then upset by the addition of approximately twenty-five gallons of water, whereupon the solution breaks down into two layers. The lower layer contains the alcohol, water, soap and an insignificant amount of the ethereal extract. The upper layer consists of the ethereal extract of the unsaponified moiety, together with a slight amount of soap. This layer is drawn off at the junction of the two layers, concentrated to approximately one-twentieth of its volume, washed with water to remove soap and other impurities, and is then evaporated to dryness, the last traces of ether and moisture being removed under vacuum.

The lower alcohol-water-soap layer before being discarded is further treated by bubbling ether through it to remove the last traces of ether-soluble material. This second supernatant ether layer is drawn off and combined with the first extraction for evaporation, washing and drying.

It will be noted that the extraction of the vitamin-containing principle in accordance with the present invention not only avoids the necessity of prolonged agitation, filtration and prolonged settling between steps, but also eliminates all danger of forming emulsions which render extraction quite difficult and incomplete, and that due to the fact that the extraction is effected by the formation of a true solution of the saponified mass to be extracted and the organic solvent, in which the different solvents are maintained in balanced phase, the extraction may not only be carried out more quickly, but also more completely, and the solvent may be easily recovered for later use.

I claim:

1. The process of producing in concentrated form the therapeutically active substances of oils, fats and like vitamin-containing materials, which comprises adding to an aqueous-alcoholic saponified mass of a vitamin-containing material ether or the like volatile organic solvent which is immiscible with water, but partially miscible with the aqueous alcoholic-saponified mass to form therewith a true solution in which a more rapid transfer of the therepeutically active substance from the vitamin-containing material to the volatile organic solvent takes place than is possible in an emulsion, the organic solvent being added in an amount sufficient to dissolve the aqueous-alcoholic saponified mass and to produce a solution wherein the solvents are in balanced phase, subsequently adding water to said solution in an amount sufficient to upset said balanced phase of the solution thereby to effect a rapid separation of the organic solvent extract which contains the therapeutically active substances from the soap solution without necessitating prolonged settling or filtration, segregating the organic solvent extract, and evaporating said organic solvent.

2. The process of producing in concentrated form the therapeutically active substances of oils, fats and like vitamin-containing materials, which comprises saponifying a vitamin-containing material with an aqueous-alcoholic caustic solution, adding to the saponified mass ether or the like volatile organic solvent which is immiscible with water, but partially miscible with the aqueous alcoholic-saponified mass to form therewith a true solution in which a more rapid transfer of the therapeutically active substance from the vitamin-containing material to the volatile organic solvent takes place than is possible in an emulsion, the organic solvent being added in an amount sufficient to dissolve the aqueous-alcoholic saponified mass and to produce a solution wherein the solvents are in balanced phase, subsequently adding sufficient water to upset said balanced phase thereby to effect a rapid separation of the organic solvent extract which contains the therapeutically active substances from the soap solution without necessitating prolonged settling or filtration, segregating the organic solvent extract, and evaporating said organic solvent.

3. The process of producing in concentrated form the therapeutically active substances of oils, fats and like vitamin-containing materials, which comprises adding to an aqueous-alcoholic saponified mass of a vitamin-containing material at least approximately 10 parts ether to 1 part water-alcohol mixture, by volume, thereby to produce a homogeneous solution wherein the water, alcohol and ether are in balanced phase and in which a more rapid transfer of the therapeutically active substance from the vitamin-containing materials to the ether takes place than is possible in an emulsion, subsequently adding sufficient water to upset said balanced phase thereby to effect a rapid separation of the ethereal extract which contains the therapeutically active substances from the soap solution without necessitating prolonged settling or filtration, segregating the ethereal extract, and evaporating the ether.

4. The process of producing in concentrated form the therapeutically active substances of oils, fats and like vitamin-containing materials, which comprises saponifying a vitamin-containing material with an aqueous-alcoholic caustic solution, adding to the saponified mass at least approximately 10 parts ether to 1 part water-alcohol mixture, by volume, thereby to produce a homogeneous solution wherein the ether, alcohol and water are in balanced phase and wherein a more rapid transfer of the therapeutically active substance from the vitamin-containing material to the ether takes place than is possible in an emulsion, subsequently adding sufficient water to upset said balanced phase thereby to effect a rapid separation of the ethereal extract which contains the therapeutically active substances from the soap solution without necessitating prolonged settling or filtration, segregating the ethereal extract, and evaporating the ether.

5. The process of extracting the therapeutically active substances from fish liver oils and like materials, which comprises saponifying approximately 5.2 parts of the oil with approximately 1 part of caustic dissolved in a mixture of approximately 3.3 parts water and 2.7 parts alcohol, adding to the saponified mass approximately 4.4 parts water and ether in an amount approximately ten times the volume of the aqueous-alcohol mixture so as to produce a homogeneous clear solution wherein the alcohol, water and ether are in balanced phase and wherein a more rapid transfer of the therapeutically active substance from the saponified mass to the ether takes place than is possible in an emulsion, subsequently adding sufficient water to upset the balanced phase thereby to effect a rapid separation of the organic solvent extract which contains the therapeutically active substances from the soap solution without necessitating prolonged settling or filtration, segregating the ethereal extract, and evaporating the ether.

JAMES A. PATCH.